(12) United States Patent
Chikazawa et al.

(10) Patent No.: US 11,125,509 B2
(45) Date of Patent: *Sep. 21, 2021

(54) HEAT STORAGE SYSTEM, HEAT STORAGE CONTAINER, HEAT STORAGE DEVICE USING HEAT STORAGE CONTAINER AND WARM-UP DEVICE USING HEAT STORAGE DEVICE

(71) Applicant: FURUKAWA ELECTRIC CO., LTD., Tokyo (JP)

(72) Inventors: Keiko Chikazawa, Tokyo (JP); Yuichi Kimura, Tokyo (JP); Kengo Tanaka, Tokyo (JP); Mamoru Shimada, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 141 days.

This patent is subject to a terminal disclaimer.

(21) Appl. No.: 16/258,361

(22) Filed: Jan. 25, 2019

(65) Prior Publication Data

US 2019/0154356 A1 May 23, 2019

Related U.S. Application Data

(63) Continuation of application No. PCT/JP2017/026275, filed on Jul. 20, 2017.

(30) Foreign Application Priority Data

Jul. 27, 2016 (JP) .............................. JP2016-147699

(51) Int. Cl.
*F28D 20/00* (2006.01)
*F25B 17/08* (2006.01)
(Continued)

(52) U.S. Cl.
CPC ............ *F28D 20/003* (2013.01); *F25B 17/08* (2013.01); *F28D 7/106* (2013.01); *F28D 15/043* (2013.01);
(Continued)

(58) Field of Classification Search
CPC . C09K 5/16; F25B 17/08; F28D 7/106; F28D 15/0233; F28D 15/043;
(Continued)

(56) References Cited

U.S. PATENT DOCUMENTS 4,510,759 A    4/1985   Sakai et al.
4,548,044 A    10/1985  Sakai et al.
(Continued)

FOREIGN PATENT DOCUMENTS

CN     107110613 A    8/2017
JP     58-47989 A     3/1983
(Continued)

OTHER PUBLICATIONS

International Preliminary Report on Patentability and the English translation of the Written Opinion of the International Searching Authority (Forms PCT/IB/373 and PCT/ISA/237), dated Jan. 29, 2019, for International Application No. PCT/JP2017/026275.
(Continued)

*Primary Examiner* — Eric S Ruppert
*Assistant Examiner* — Hans R Weiland
(74) *Attorney, Agent, or Firm* — Birch, Stewart, Kolasch & Birch, LLP

(57) ABSTRACT

A heat storage system using a heat storage container having a tubular body, an adsorbent that is accommodated in the tubular body, generates heat by adsorption of an adsorbate and absorbs heat by desorption of the adsorbate, and a flow channel that penetrates the tubular body in a longitudinal direction, the heat storage system comprising a diffusion (Continued)

layer for transporting the adsorbate in liquid phase from the flow channel to the adsorbent, wherein the adsorbate is transported to the flow channel, the adsorbate is transported to the diffusion layer, a part of the adsorbate transported to the diffusion layer is adsorbed on the adsorbent, the adsorbent releases heat, and the remaining adsorbate is vaporized by the heat to become heat transport fluid.

8 Claims, 6 Drawing Sheets

(51) Int. Cl.
*F28D 15/04* (2006.01)
*F28D 7/10* (2006.01)
*F28D 15/06* (2006.01)
*F28D 15/02* (2006.01)
*F28D 21/00* (2006.01)

(52) U.S. Cl.
CPC ........ *F28D 15/046* (2013.01); *F28D 15/0233* (2013.01); *F28D 15/06* (2013.01); *F28D 2020/0017* (2013.01); *F28D 2021/0019* (2013.01); *F28F 2255/18* (2013.01); *Y02A 30/27* (2018.01); *Y02B 30/00* (2013.01); *Y02B 30/62* (2013.01); *Y02E 60/14* (2013.01)

(58) Field of Classification Search
CPC ................... F28D 15/06; F28D 20/003; F28D 2020/0013; F28D 2020/0017; F28D 2020/0069; F28D 2021/0019; F28F 2255/18; Y02A 30/27; Y02B 30/00; Y02B 30/62
See application file for complete search history.

(56) References Cited

U.S. PATENT DOCUMENTS

| | | | |
|---|---|---|---|
| 4,881,593 A | 11/1989 | Okayasu | |
| 5,384,101 A * | 1/1995 | Rockenfeller | F25B 35/04 422/211 |
| 6,155,073 A * | 12/2000 | Gray | F25B 35/04 62/480 |
| 2006/0112706 A1 | 6/2006 | Inoue et al. | |
| 2014/0238071 A1* | 8/2014 | Brunschwiler | B01J 20/3042 62/476 |
| 2016/0257181 A1* | 9/2016 | Zhou | B60H 1/32014 |
| 2016/0290696 A1* | 10/2016 | Barot | B60H 1/32014 |
| 2017/0234625 A1 | 8/2017 | Inagaki et al. | |
| 2017/0336151 A1 | 11/2017 | Shimada et al. | |
| 2020/0287255 A1* | 9/2020 | Herrmann | H01M 10/625 |

FOREIGN PATENT DOCUMENTS

| | | |
|---|---|---|
| JP | S61-76887 A | 4/1986 |
| JP | 1-167595 A | 7/1989 |
| JP | 4-306457 A | 10/1992 |
| JP | 11-294980 A | 10/1999 |
| JP | 2005-212735 A | 8/2005 |
| JP | 2009-228952 A | 10/2009 |
| JP | 2009-257698 A | 11/2009 |
| JP | 2010-169297 A | 8/2010 |
| JP | 2016-70542 A | 5/2016 |
| JP | 2016-95108 A | 5/2016 |
| TW | 201623899 A | 7/2016 |
| WO | WO 2009/072290 A1 | 6/2009 |
| WO | WO 2016/121778 A1 | 8/2016 |

OTHER PUBLICATIONS

International Search Report issued in PCT/JP2017/026275 (PCT/ISA210), dated Oct. 10, 2017.
Written Opinion of the International Searching Authority issued in PCT/JP2017/026275 (PCT/ISA237), dated Oct. 10, 2017.
Japanese Office Action, dated Mar. 2, 2020, issued in corresponding Japanese Patent Application No. 2016-147699.
Chinese Office Action dated Jan. 10, 2020, issued in Chinese Application No. 201780045253.2.
Chinese Office Action and Search Report dated Jun. 11, 2020 for Application No. 201780045253.2, along with an English translation of the Office Action.
German Office Action for corresponding German Application No. 112017003771.9, dated Oct. 28, 2020, with an English translation.

* cited by examiner

HEAT STORAGE SYSTEM, HEAT STORAGE CONTAINER, HEAT STORAGE DEVICE USING HEAT STORAGE CONTAINER AND WARM-UP DEVICE USING HEAT STORAGE DEVICE

CROSS REFERENCE TO RELATED APPLICATIONS

This is a continuation application of International Patent Application No. PCT/JP2017/026275 filed Jul. 20, 2017, which claims the benefit of Japanese Patent Application No. 2016-147699, filed Jul. 27, 2016, the full contents of all of which are hereby incorporated by reference in their entirety.

BACKGROUND

Technical Field

The present disclosure relates to a heat storage container using an adsorbent (for example, zeolite) capable of repeating heat generation and heat storage utilizing the function of the adsorbent that releases heat when adsorbing an adsorbate (for example, water) and absorbs heat when the adsorbate (for example, water) is desorbed, and relates to a heat storage device including the heat storage container.

Background

In recent years, heat storage systems have been considered for storage and utilization of waste heat in industrial plants, especially for storage and utilization of waste heat from an automobile engine.

There is proposed a heat storage container 6, in which a chemical heat storage material composite containing a powder chemical heat storage material 62, and an expanding material foam 63 disposed adjacent to the chemical heat storage material 62 is accommodated between an inner tube 61 and an outer tube 67, a reaction flow channel 64 for circulating water vapor as a reactant/reaction product caused by heat storage and heat release of the chemical heat storage material 62 is formed inside the inner tube 61, and a heat exchange flow channel 66 for circulating gaseous fluid as a heat exchange medium that performs heat exchange with the chemical heat storage material 62 is provided between the outer tube 67 and an outer wall 65, as illustrated in FIG. 8, (Japanese Patent Application Publication No. 2009-228952).

However, in the heat storage container 6 of Japanese Patent Application Publication No. 2009-228952, the reaction flow channel 64 that supplies water vapor, and the heat exchange flow channel 66 that supplies a heat exchange medium need to be separately provided, and therefore there is a problem that a piping configuration is complicated. Additionally, an amount of the chemical heat storage material 62 mountable on the heat storage container 6 is reduced due to the complication of the piping configuration, and therefore there is a problem that a use heat amount per unit volume (heat storage density) of the heat storage container 6 is reduced.

Moreover, the heat storage material has a problem that since a temperature required for storing heat (heat storage temperature) is as high as 350° C. or more, heat storage is difficult depending on where the heat storage container is installed.

SUMMARY

The present disclosure is related to provide a heat storage system and a heat storage container capable of improving a heat generation amount and a heat transport amount with a simple configuration, and a heat storage device using the above heat storage container, and a warm-up device using the above heat storage device.

According to an aspect of the present disclosure, a heat storage system using a heat storage container having a tubular body, an adsorbent that is accommodated in the tubular body, generates heat by adsorption of an adsorbate and absorbs heat by desorption of the adsorbate, and a flow channel that penetrates the tubular body in a longitudinal direction, includes a diffusion layer for transporting the adsorbate in liquid phase from the flow channel to the adsorbent, wherein the adsorbate is transported to the flow channel, the adsorbate is transported to the diffusion layer, a part of the adsorbate transported to the diffusion layer is adsorbed on the adsorbent, the adsorbent releases heat, and the remaining adsorbate is vaporized by the heat to become heat transport fluid.

In the above aspect, the adsorbate functions as a medium contributing to heat absorption and heat generation of the adsorbent, and also functions as a heat transport fluid (i.e., heat transport medium) by undergoing a phase change from liquid to gas.

According to an aspect of the heat storage system, the heat transport fluid is transported to a heat exchanger to be phase-changed from a vapor phase to a liquid phase.

According to an aspect of the heat storage system, the diffusion layer is a structure having a capillary structure.

According to an aspect of the present disclosure, a heat storage container includes: a tubular body; an adsorbent that is accommodated in the tubular body, generates heat by adsorption of an adsorbate and absorbs heat by desorption of the adsorbate; a flow channel that penetrates the tubular body in a longitudinal direction; and a diffusion layer provided between the adsorbent and the flow channel.

According to an aspect of the heat storage container, the flow channel penetrates the adsorbent.

According to an aspect of the heat storage container, the heat storage container further includes a holding member that holds a shape of the adsorbent.

According to an aspect of the heat storage container, a part or a whole of the holding member forms the diffusion layer.

According to an aspect of the heat storage container, the diffusion layer is a structure having a capillary structure.

According to an aspect of the present disclosure, a heat storage container includes: a tubular body; an adsorbent that is accommodated in the tubular body, generates heat by adsorption of an adsorbate and absorbs heat by desorption of the adsorbate; a first lid body that is a porous body, and is provided adjacent to the adsorbent on a side of one end portion of the tubular body; a second lid body that is a porous body, and is provided adjacent to the adsorbent on a side of another end portion of the tubular body; a first wick structure that is provided adjacent to inside of the adsorbent between the first lid body and the second lid body, and has a capillary structure; and a flow channel that is provided inside the first wick structure, and penetrates the tubular body in a longitudinal direction.

In the above aspect, the adsorbate in liquid phase functioning as a medium contributing to heat absorption and heat generation by the adsorbent is supplied to the first wick structure provided adjacent to the inside of the adsorbent, so that the adsorbate in liquid phase moves to a whole of the first wick structure by capillary force of the first wick structure. The adsorbate in liquid phase that moves to the whole of the first wick structure is adsorbed on the adsorbent, and heat is released from the adsorbent. Additionally, the adsorbate in liquid phase that passes through the first lid body is adsorbed on the adsorbent, and heat is released from the adsorbent. On the other hand, the adsorbate in liquid phase is similarly supplied into the flow channel from one open end portion of the flow channel provided inside the first wick structure. The adsorbate in liquid phase which is supplied into the flow channel receives the above heat and vaporizes, that is, undergoes a phase change to the adsorbate in gas phase, while flowing inside the flow channel from the one open end portion to another open end portion of the flow channel.

The adsorbate in gas phase generated inside the flow channel is transported as heat transport fluid for transporting the heat from the other open end portion of the flow channel to a heat exchanger (for example, a condenser) thermally connected to a heat use destination. Accordingly, the flow channel is a passage for the heat transport fluid.

On the other hand, external heat of the heat storage container is movable to the adsorbent accommodated in the tubular body through a wall surface of the tubular body of the heat storage container. With the heat that moves into the tubular body, the adsorbate is desorbed from the adsorbent, so that the adsorbent keeps (stores) the heat moved into the tubular body.

In the above aspect, the adsorbent is disposed between the wall surface of the tubular body and the first wick structure. The porous bodies which are materials of the first lid body and the second lid body each have a structure of having a plurality of through holes having such a size as to enable passing of the adsorbate in liquid phase but not to allow passing of the adsorbent. The "inside" in this specification means a central axis side in the longitudinal direction of the tubular body with respect to the inner surface (inner peripheral surface) of the tubular body. As described later, a plurality of flow channels may be provided, and, in this case, the "inside" means a side in the direction from the tabular body toward the first wick structure.

According to an aspect of the present disclosure, a heat storage container includes: a tubular body; an adsorbent that is accommodated in the tubular body, generates heat by adsorption of an adsorbate and absorbs heat by desorption of the adsorbate; a first lid body that is a porous body, and is provided adjacent to the adsorbent on a side of one end portion of the tubular body; a second lid body that is a porous body, and is provided adjacent to the adsorbent on a side of another end portion of the tubular body; a first wick structure that is provided adjacent to inside of the adsorbent between the first lid body and the second lid body, and has a capillary structure; and a flow channel that is provided inside the first wick structure, and is formed in a longitudinal direction of the tubular body, wherein the flow channel is blocked by the first lid body.

According to an aspect of the heat storage container, an inner tube forming the flow channel is accommodated in the tubular body. In this aspect, an inner portion of the inner tube is the flow channel.

According to an aspect of the present disclosure, a heat storage container includes: a tubular body; an adsorbent that is accommodated in the tubular body, generates heat by adsorption of an adsorbate and absorbs heat by desorption of the adsorbate; a first lid body that is a porous body, and is provided adjacent to the adsorbent on a side of one end portion of the tubular body; a second lid body that is a porous body, and is provided adjacent to the adsorbent on a side of another end portion of the tubular body; a first wick structure that is provided between the first lid body and the second lid body and between the adsorbent and the tubular body, and has a capillary structure; and an inner tube that has an outer surface in contact with the adsorbent, and forms a flow channel which penetrates the tubular body in a longitudinal direction.

In the above aspect, the adsorbent is disposed between the first wick structure and the outer surface (outer peripheral surface) of the inner tube forming the flow channel.

According to an aspect of the present disclosure, a heat storage container includes: a tubular body; an adsorbent that is accommodated in the tubular body, generates heat by adsorption of an adsorbate and absorbs heat by desorption of the adsorbate; a first lid body that is a porous body, and is provided adjacent to the adsorbent on a side of one end portion of the tubular body; a second lid body that is a porous body, and is provided adjacent to the adsorbent on a side of another end portion of the tubular body; a first wick structure that is provided between the first lid body and the second lid body and between the adsorbent and the tubular body, and has a capillary structure; and an inner tube that has an outer surface in contact with the adsorbent, and forms a flow channel in a longitudinal direction of the tubular body, wherein the flow channel is blocked by the first lid body.

According to an aspect of the heat storage container, a second wick structure having a capillary structure is provided on an inner surface of the inner tube.

In this aspect, the adsorbate in liquid phase is supplied not only to the first wick structure but also to the second wick structure. The adsorbate in liquid phase supplied to the second wick structure is vaporized by receiving the heat, and becomes heat transport fluid.

According to an aspect of the heat storage container, the first wick structure is metal mesh, or a metal sintered compact formed by sintering a powdery metal material.

According to an aspect of the heat storage container, the first wick structure is a groove that is formed in an outer surface of the inner tube and has capillary force.

According to an aspect of the heat storage container, the first wick structure is a groove that is formed in an inner surface of the tubular body and has capillary force.

According to an aspect of the heat storage container, the second wick structure is metal mesh, a metal sintered compact formed by sintering a powdery metal material, or a groove that is formed in an inner surface of the inner tube and has capillary force.

According to an aspect of the present disclosure, a heat storage device includes a circulation system including: a heat storage container having a tubular body, an adsorbent that is accommodated in the tubular body, generates heat by adsorption of an adsorbate and absorbs heat by desorption of the adsorbate, a flow channel that penetrates the tubular body in a longitudinal direction, and a diffusion layer provided between the adsorbent and the flow channel; a heat transport fluid container that is connected to one end portion of the tubular body, and accommodates the adsorbate in liquid phase; a heat exchanger connected to another end portion of the tubular body; a first piping system that connects the heat storage container to the heat transport fluid container; and a third piping system that connects the heat transport fluid container to the heat exchanger, the circulation system being in an airtight state, and being deaerated, wherein the first piping system is provided with a first valve, and the first valve is closed in accordance with a heat release temperature of the heat storage container.

According to an aspect of the heat storage device, the first valve is closed, when a predetermined time elapses from start of heat release of the adsorbent, when a predetermined amount of the adsorbate is returned to the heat transport fluid container, or when a heat release amount of the heat exchanger reaches a predetermined value.

According to an aspect of the present disclosure, a heat storage device includes a circulation system including: a heat storage container having a tubular body, an adsorbent that is accommodated in the tubular body, generates heat by adsorption of an adsorbate and absorbs heat by desorption of the adsorbate, a flow channel that penetrates the tubular body in a longitudinal direction, and a diffusion layer provided between the adsorbent and the flow channel; a heat transport fluid container that is connected to one end portion of the tubular body, and accommodates the adsorbate in liquid phase; a heat exchanger connected to another end portion of the tubular body; a first piping system that connects the heat storage container to the heat transport fluid container; and a third piping system that connects the heat transport fluid container to the heat exchanger, the circulation system being in an airtight state, and being deaerated, wherein the first piping system is provided with a first valve, the third piping system is provided with a second valve, and the second valve is closed in accordance with an accommodation amount of the adsorbate in liquid phase in the heat transport fluid container after the first valve is closed.

According to an aspect of the heat storage device, the first piping system is further provided with a backflow prevention member.

According to an aspect of the present disclosure, a heat storage device includes a circulation system including: a heat storage container having a tubular body, an adsorbent that is accommodated in the tubular body, generates heat by adsorption of an adsorbate and absorbs heat by desorption of the adsorbate, a first lid body that is a porous body and is provided adjacent to the adsorbent on a side of one end portion of the tubular body, a second lid body that is a porous body and is provided adjacent to the adsorbent on a side of another end portion of the tubular body, a first wick structure that is provided adjacent to inside of the adsorbent between the first lid body and the second lid body and has a capillary structure, and a flow channel that is provided inside the first wick structure and penetrates the tubular body in a longitudinal direction; a heat transport fluid container that is connected to the one end portion of the tubular body, and accommodates the adsorbate in liquid phase; a condenser that is connected to the other end portion of the tubular body, and liquefies the vaporized adsorbate; and a piping system that connects the heat transport fluid container and the condenser, and supplies, to the heat transport fluid container, the adsorbate in liquid phase obtained by the condenser, the circulation system being in an airtight state, and being deaerated, wherein a backflow suppression member is disposed between the heat storage container and the heat transport fluid container.

In the above aspect, if the backflow suppression member is, for example, a porous body, the porous body has a large number of through holes each having such a size as to enable passing of the adsorbate in liquid phase.

According to an aspect of the present disclosure, a heat storage device includes a circulation system including: a heat storage container having a tubular body, an adsorbent that is accommodated in the tubular body, generates heat by adsorption of an adsorbate and absorbs heat by desorption of the adsorbate, a first lid body that is a porous body and is provided adjacent to the adsorbent on a side of one end portion of the tubular body, a second lid body that is a porous body and is provided adjacent to the adsorbent on a side of another end portion of the tubular body, a first wick structure that is provided adjacent to inside of the adsorbent between the first lid body and the second lid body and has a capillary structure, and a flow channel that is provided inside the first wick structure and is formed in a longitudinal direction of the tubular body, the flow channel being blocked by the first lid body; a heat transport fluid container that is connected to the one end portion of the tubular body, and accommodates the adsorbate in liquid phase; a condenser that is connected to the other end portion of the tubular body, and liquefies the vaporized adsorbate; and a piping system that connects the heat transport fluid container and the condenser, and supplies, to the heat transport fluid container, the adsorbate in liquid phase obtained by the condenser, the circulation system being in an airtight state, and being deaerated, wherein a backflow suppression member is disposed between the heat storage container and the heat transport fluid container.

According to an aspect of the heat storage device, an inner tube forming the flow channel is accommodated in the tubular body.

According to an aspect of the present disclosure, a heat storage device includes a circulation system including: a heat storage container having a tubular body, an adsorbent that is accommodated in the tubular body, generates heat by adsorption of an adsorbate and absorbs heat by desorption of the adsorbate, a first lid body that is a porous body and is provided adjacent to the adsorbent on a side of one end portion of the tubular body, a second lid body that is a porous body and is provided adjacent to the adsorbent on a side of another end portion of the tubular body, a first wick structure that is provided between the first lid body and the second lid body and between the adsorbent and the tubular body and has a capillary structure, and an inner tube that has an outer surface in contact with the adsorbent and forms a flow channel which penetrates the tubular body in a longitudinal direction; a heat transport fluid container that is connected to the one end portion of the tubular body, and accommodates the adsorbate in liquid phase; a condenser that is connected to the other end portion of the tubular body, and liquefies the vaporized adsorbate; and a piping system that connects the heat transport fluid container and the condenser, and supplies, to the heat transport fluid container, the adsorbate in liquid phase obtained by the condenser, the circulation system being in an airtight state, and being deaerated, wherein a backflow suppression member is disposed between the heat storage container and the heat transport fluid container.

According to an aspect of the present disclosure, a heat storage device includes a circulation system including: a heat storage container having a tubular body, an adsorbent that is accommodated in the tubular body, generates heat by adsorption of an adsorbate and absorbs heat by desorption of the adsorbate, a first lid body that is a porous body and is provided adjacent to the adsorbent on a side of one end portion of the tubular body, a second lid body that is a porous body and is provided adjacent to the adsorbent on a side of another end portion of the tubular body, a first wick structure that is provided between the first lid body and the second lid body and between the adsorbent and the tubular body and has a capillary structure, and an inner tube that has an outer surface in contact with the adsorbent and forms a flow channel in a longitudinal direction of the tubular body, the flow channel being blocked by the first lid body; a heat transport fluid container that is connected to the one end portion of the tubular body, and accommodates the adsorbate in liquid phase; a condenser that is connected to the other end portion of the tubular body, and liquefies the vaporized adsorbate; and a piping system that connects the heat transport fluid container and the condenser, and supplies, to the heat transport fluid container, the adsorbate in liquid phase obtained by the condenser, the circulation system being in an airtight state, and being deaerated, wherein a backflow suppression member is disposed between the heat storage container and the heat transport fluid container.

According to an aspect of the heat storage device, the backflow suppression member is integrated with the first lid body.

According to an aspect of the heat storage device, heat transport fluid supplying means is provided between the backflow suppression member and the heat transport fluid container.

According to an aspect of the heat storage device, heat transport fluid supplying means is provided between the condenser and the heat transport fluid container.

According to an aspect of the present disclosure, a warm-up device uses the above heat storage device.

According to an aspect of the present disclosure, an adsorbent processing method includes the steps of: molding an adsorbent that generates heat by adsorption of an adsorbate and absorbs heat by desorption of the adsorbate in a predetermined shape; inserting a core rod into the adsorbent; inserting a powdery metal material between an outer surface of the core rod and an inner surface of a hole portion of the adsorbent; and heating or sintering the powdery metal material.

According to the aspect of the present disclosure, the adsorbate functions as a medium contributing to heat absorption and heat generation of the adsorbent, and also functions as the heat transport fluid (heat transport medium) for transporting heat released from the adsorbent to a heat use destination by undergoing a phase change from liquid to gas, and therefore a route for the adsorbate and a route for the heat transport fluid do not need to be separate routes, and can be brought together into one system. Thus, it is possible to simplify the structure of a piping route. Additionally, since not vapor but the adsorbate in liquid form is supplied to the adsorbent, it is possible to obtain excellent heat storage density.

According to the aspect of the present disclosure, the diffusion layer is provided between the adsorbent and the flow channel, and therefore the adsorbate in liquid phase is smoothly and reliably diffused over the whole of the adsorbent through the diffusion layer. Accordingly, heat generation speed and heat generation efficiency of the adsorbent are further improved.

According to the aspect of the present disclosure, one end portion of the adsorbent is covered with the first lid body, another end portion of the adsorbent is covered with the second lid body, and a side surface portion of the inside of the adsorbent between the first lid body and the second lid body is covered with the first wick structure, and therefore even when liquid such as water is used as the adsorbate, it is possible to prevent shape collapse of the molded adsorbent. Additionally, the shape of the adsorbent is maintained by the first lid body, the second lid body, and the first wick structure.

According to the aspect of the present disclosure, the inner tube is disposed in the tubular body, and therefore the first wick structure can be protected from external environment by the inner tube. Furthermore, it is possible to reliably maintain the shape of the flow channel by the inner tube.

According to the aspect of the present disclosure, the second wick structure is disposed on the inner surface (inner peripheral surface) of the inner tube, and therefore the adsorbate in liquid phase is widely diffused on the inner surface of the inner tube by capillary force of the second wick structure. Accordingly, the adsorbate supplied into the inner tube, namely the flow channel, can be more efficiently vaporized. Additionally, the adsorbate is absorbed in the second wick structure, so that a contact area of the adsorbate to the heat is increased, and therefore it is possible to more efficiently vaporize the adsorbate in liquid phase.

According to the aspect of the present disclosure, the first valve is provided in the first piping system that connects the heat storage container to the heat transport fluid container, and the first valve is closed in accordance with the heat release temperature of the heat storage container, and therefore it is possible to precisely control endothermic and exothermic with the adsorbent.

According to the aspect of the present disclosure, the backflow suppression member is disposed inside the pipe between the heat storage container and the heat transport fluid container, and therefore it is possible to prevent backflow of the adsorbate vaporized inside the heat storage container toward the heat transport fluid container, and it is possible to improve heat transport efficiency of the heat storage device.

BRIEF DESCRIPTION OF DRAWINGS

FIG. 1 B is an A-A' sectional view of the heat storage container in FIG. 1 A.

FIG. 2 B is a B-B' sectional view of the heat storage container in FIG. 2 A.

DETAILED DESCRIPTION

Figure 1A:
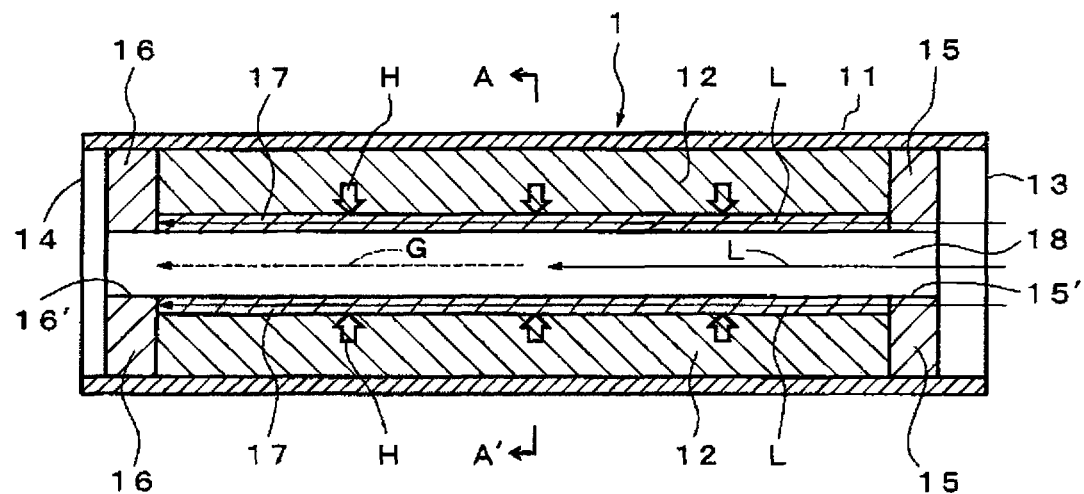
FIG. 1 A is a sectional view of a side surface of a heat storage container according to a first embodiment of the present disclosure.
Figure 1B:
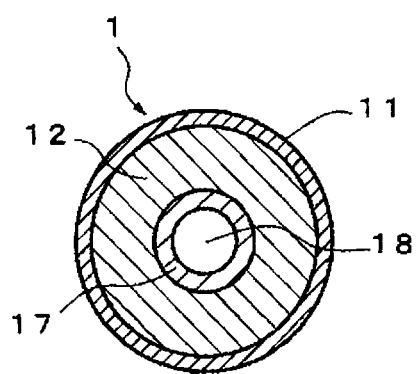

Further features of the present disclosure will become apparent from the following detailed description of exemplary embodiments with reference to the accompanying drawings. Hereinafter, a heat storage container according to a first embodiment of the present disclosure will be described with reference to the drawings. As illustrated in FIG. 1 A, a heat storage container 1 according to the first embodiment includes a cylindrical body 11 that is a tubular body having both open end portions, and an adsorbent 12 disposed inside the cylindrical body 11. Additionally, the heat storage container 1 includes a first lid body 15 that is disposed adjacent to the adsorbent 12 on a side of one end portion 13 of the cylindrical body 11, and is composed of a porous body, a second lid body 16 that is disposed adjacent to the adsorbent 12 on a side of another end portion 14 of the cylindrical body 11, and is composed of a porous body, and a first wick structure 17 that is disposed adjacent to an inner side surface of the adsorbent 12 between the first lid body 15 and the second lid body 16, is a diffusion layer for transporting liquid, and has a capillary structure.

As illustrated in FIG. 1 B, a radial cross-section of the cylindrical body 11 has a circular shape. The adsorbent 12 has a form in which powder is compression-molded cylindrically, and a radial cross-section of the adsorbent 12 has a circular shape. A central axis of the cylindrical body 11 and a central axis of the cylindrical adsorbent 12 are coaxially disposed.

The first lid body 15 and the second lid body 16 each has a circular shape having a hole portion formed at a central portion, a wall surface of a hole portion 15' of the first lid body 15 and a wall surface of a hole portion 16' of the second lid body 16 are a part of a wall surface of a flow channel 18 described below, and form end portions of the flow channel 18. Accordingly, the hole portions 15', 16' each have a shape and a size corresponding to a shape and a size of a radial cross-section of the flow channel 18.

As illustrated in FIG. 1 A and FIG. 1 B, in the heat storage container 1, the first lid body 15, the second lid body 16, the first wick structure 17, and an inner surface of the cylindrical body 11 are each in direct contact with a facing region of the adsorbent 12. The first lid body 15 covers an end surface of one end portion of the adsorbent 12, the second lid body 16 covers another end portion of the adsorbent 12, the first wick structure 17 covers the inner side surface of the adsorbent 12, and the inner surface of the cylindrical body 11 covers an outer side surface of the adsorbent 12. The first lid body 15, and the second lid body 16 are accommodated in inner portions with respect to the one end portion 13 and the other end portion 14 of the cylindrical body 11, respectively. Additionally, the first wick structure 17 is connected to a peripheral edge portion of the hole portion 15' in a surface of the first lid body 15, and a peripheral edge portion of the hole portion 16' in a surface of the second lid body 16. More specifically, one end portion of the first wick structure 17 is in contact with the first lid body 15 having the hole portion 15' forming one open end portion of the flow channel 18, and another end portion of the first wick structure 17 is in contact with the second lid body 16 having the hole portion 16' forming another open-end portion of the flow channel 18. Accordingly, in the heat storage container 1, the adsorbent 12 is covered in contact with the first lid body 15, the second lid body 16, the first wick structure 17, and the inner surface of the cylindrical body 11.

In the heat storage container 1, the first wick structure 17 has a cylindrical shape, and the radial cross-section has a circular shape. That is, inside the first wick structure 17, a space portion that penetrates the cylindrical body 11 in a longitudinal direction, that is, the flow channel 18 is provided. Accordingly, an inner peripheral surface of the first wick structure 17 becomes the wall surface of the flow channel 18.

The adsorbent 12 is covered in contact with the first lid body 15, the second lid body 16, the first wick structure 17, and the inner surface of the cylindrical body 11, and therefore even when liquid such as water is used as an adsorbate, it is possible to maintain the shape of the compression-molded adsorbent 12. Accordingly, the first wick structure 17 also functions as a holding member for the shape of the adsorbent 12. Additionally, a part of liquid-phase heat transport fluid L functioning as the adsorbate is supplied to one end portion of the adsorbent 12 through the first lid body 15.

Furthermore, the liquid-phase heat transport fluid L functioning as the adsorbate is smoothly supplied from one end portion of the adsorbent 12 to a whole of the inner side surface of the adsorbent 12 by capillary force that the first wick structure 17 has. In other words, with the capillary force of the first wick structure 17, the liquid-phase heat transport fluid L functioning as the adsorbate can smoothly and reliably flow from one end portion to another end portion of the adsorbent 12 along the longitudinal direction of the first wick structure 17, that is, along the longitudinal direction of the cylindrical body 11.

The first wick structure 17 is in contact with the inner peripheral surface of the adsorbent 12, and therefore the liquid-phase heat transport fluid L, which is absorbed in the first wick structure 17 and functions as the adsorbate, is quickly adsorbed on the adsorbent 12, and the adsorbent 12 releases heat H. Additionally, the liquid-phase heat transport fluid L which has passed through the first lid body 15 and functions as the adsorbate is adsorbed on the adsorbent 12, and then the adsorbent 12 releases the heat H.

The first wick structure 17, which is thermally connected to the adsorbent 12 by contact with the inner peripheral surface of the adsorbent 12, receives the heat H released from the adsorbent 12. The heat H received by the first wick structure 17 moves to the liquid-phase heat transport fluid L functioning as the adsorbate similarly, which is supplied from one end portion of the flow channel 18 and is in the flow channel 18. Consequently, the liquid-phase heat transport fluid L undergoes a phase change from liquid to gas while moving from the one end portion to another end portion inside the flow channel 18. The heat transport fluid functioning as the adsorbate, which is vaporized inside the flow channel 18 (i.e., gas-phase heat transport fluid G), is released from the other end portion of the flow channel 18 to outside of the heat storage container 1, and further transports the heat H toward the heat use destination. Thus, the flow channel 18 functions as a passage for the gas-phase heat transport fluid G. In the heat storage container 1, the radial cross-section of the flow channel 18 has a circular shape, and a central axis of the flow channel 18 is disposed coaxially with the central axis of the cylindrical body 11.

Thus, the liquid heat transport fluid L functioning as a medium functions as a reaction medium to the chemical heat storage material, and functions as the heat transport fluid for transporting heat stored in the adsorbent to the heat use destination, and therefore a route for the adsorbate and a route for the heat transport fluid (heat transport medium) do not need to be separate respective routes, and a structure of piping route can be simplified. Additionally, not vapor but liquid adsorbs an adsorbate, and therefore it is possible to obtain excellent heat storage density.

The first lid body 15 and the second lid body 16 each are a porous body having through holes each having such a size as to enable passing of the liquid-phase heat transport fluid L but not to allow passing of powder of the adsorbent 12. As long as the size (mean opening diameter) of the through holes of the porous body is a size having the above function, the size is not particularly limited, and is, for example, 50 micrometers or less. Additionally, a material of each of the first lid body 15 and the second lid body 16 is not particularly limited, and examples of the material can include a sintered compact of metal powder such as copper powder, metal mesh, foam metal, metallic foil provided with a through hole, a metal plate provided with a through hole, and the like.

As long as the first wick structure 17 has a capillary structure, the first wick structure 17 is not particularly limited. For example, a member such as a metal sintered compact formed by sintering a powdery metal material, and metal mesh can be used. Additionally, the first wick structure 17 may be a body separated from the first lid body 15 and the second lid body 16 like the heat storage container 1, and in a case where the sintered compact of the metal powder such as the copper powder, and the metal mesh is used as the first wick structure 17, the first wick structure 17 may be integrated with the first lid body 15 and the second lid body 16.

A material of the cylindrical body 11 is not particularly limited, and examples of the material can include copper, aluminum, stainless steel, and the like. Examples of the adsorbent 12 can include zeolite, sepiolite, activated carbon, silica gel, mesoporous silica, and the like. The adsorbent 12 may be contained in an amount of 60% by mass or more based on the total amount of a later-described binder and the adsorbent 12. The form and size of the adsorbent 12 are not particularly limited, and may be, for example, a powder or bead form. When the adsorbent 12 is a bead form, beads having a uniform size or a combination of beads having a plurality of sizes may be used. Examples of the liquid-phase heat transport fluid L having a function as an adsorbate can include water, an alcohol such as ethanol, and a mixture of water and an alcohol.

Figure 2A:
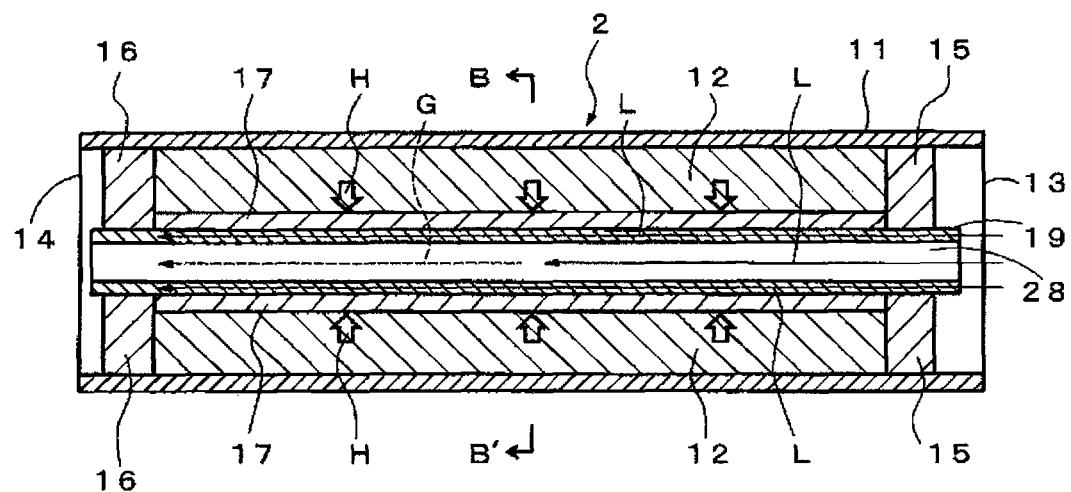
FIG. 2 A is a sectional view of a side surface of a heat storage container according to a second embodiment of the present disclosure.
Figure 2B:
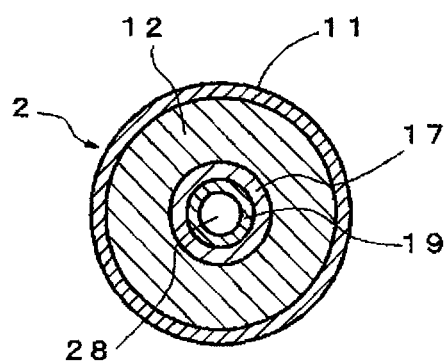

Now, a heat storage container according to a second embodiment of the present disclosure will be described with reference to the drawings. Description will be made while components identical with the component of the heat storage container 1 are denoted by the same reference numerals. As illustrated in FIG. 2 A and FIG. 2 B, in a heat storage container 2 according to the second embodiment, an inner tube 19 that is a tubular material having both open end portions is inserted through an inner peripheral surface of the first wick structure 17 having a cylindrical longitudinal shape and a circular radial cross-section. Accordingly, in the heat storage container 2 according to the second embodiment, an inner surface of the inner tube 19 becomes a wall surface of the flow channel 28. Additionally, the inner peripheral surface of the first wick structure 17 is in contact with an outer surface of the inner tube 19, so that the inner tube 19 is thermally connected to the first wick structure 17.

A radial cross-section of the inner tube 19 has a circular shape, a central axis of the inner tube 19 (i.e., a central axis of the flow channel 28) is disposed coaxially with a central axis of a cylindrical body 11. Additionally, the respective end portions of the inner tube 19 are located at inner portions with respect to one end portion 13 and another end portion 14 of the cylindrical body 11.

In the heat storage container 2 according to the second embodiment, heat H received by the first wick structure 17 moves, through the inner tube 19, to liquid-phase heat transport fluid L, which is supplied from one end portion of the flow channel 28, and is inside the flow channel 28. Additionally, the inner tube 19 is inserted through the inner peripheral surface of the first wick structure 17, so that an inner side surface of the first wick structure 17 is protected from external environment. Furthermore, shape change of the first wick structure 17 can be prevented by the inner tube 19, and therefore it is possible to reliably maintain a shape of the flow channel 28.

A material of the inner tube 19 is not particularly limited, and examples of the material can include copper, aluminum, stainless steel, and the like.

Figure 3:
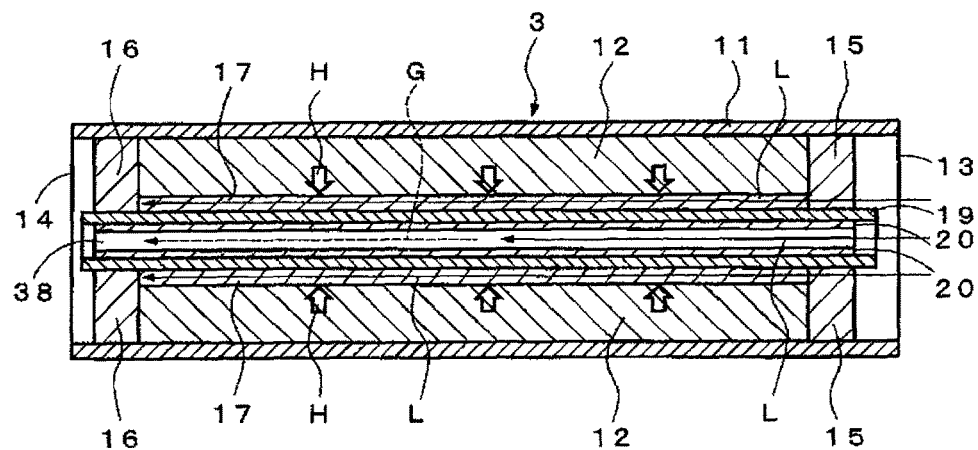
FIG. 3 is a sectional view of a side surface of a heat storage container according to a third embodiment of the present disclosure.

Now, a heat storage container according to a third embodiment of the present disclosure will be described with reference to the drawings. Description will be made while components identical with the component of the heat storage containers 1, 2 are denoted by the same reference numerals. As illustrated in FIG. 3, in a heat storage container 3 according to the third embodiment, a second wick structure 20 having a capillary structure is provided on an inner surface of an inner tube 19.

In the heat storage container 3 according to the third embodiment, a flow channel 38 that penetrates a cylindrical body 11 in a longitudinal direction is provided inside the second wick structure 20. An inner peripheral surface of the second wick structure 20 becomes a wall surface of the flow channel 38. Additionally, both end portions of the second wick structure 20 become both open end portions of the flow channel 38. The second wick structure 20 has a cylindrical shape, and has a circular radial cross-section. A central axis of the second wick structure 20 (i.e., a central axis of the flow channel 38) is disposed coaxially with a central axis of the cylindrical body 11.

In the heat storage container 3 according to the third embodiment, the inner surface of the inner tube 19 and an outer peripheral surface of the second wick structure 20 are in contact with each other, so that the second wick structure 20 is thermally connected to the inner tube 19. In the heat storage container 3, heat H received by the first wick structure 17 moves to liquid-phase heat transport fluid L, which is supplied from one end portion of the flow channel 38, and is inside the flow channel 38, through the inner tube 19 and the second wick structure 20.

In the heat storage container 3, the liquid-phase heat transport fluid L is widely diffused on the inner surface of the inner tube 19 by capillary force of the second wick structure 20. Accordingly, the liquid-phase heat transport fluid L supplied to the flow channel 38 can be more effectively vaporized. Additionally, the liquid-phase heat transport fluid L is absorbed in the second wick structure 20, so that a contact area of the liquid-phase heat transport fluid L to the heat H is increased, and therefore it is possible to more effectively vaporize the liquid-phase heat transport fluid L inside the flow channel 38.

As long as the second wick structure 20 has a capillary structure, the second wick structure 20 is not particularly limited. For example, a member such as a metal sintered compact formed by sintering a powdery metal material, and metal mesh can be used.

Figure 4:
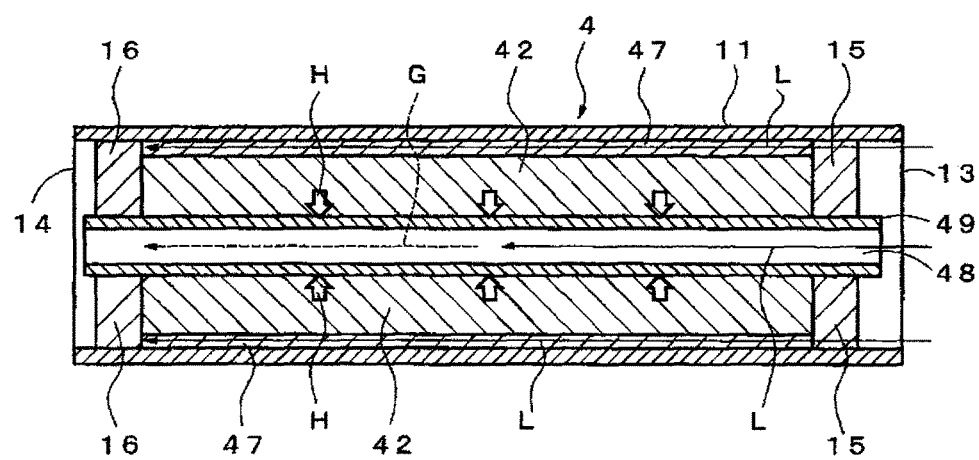
FIG. 4 is a sectional view of a side surface of a heat storage container according to a fourth embodiment of the present disclosure.

Now, a heat storage container according to a fourth embodiment of the present disclosure will be described with reference to the drawings. Description will be made while components identical with the component of the heat storage containers 1, 2, 3 are denoted by the same reference numerals. As illustrated in FIG. 4, in a heat storage container 4 according to the fourth embodiment, a first wick structure 47 is disposed between a adsorbent 42 and a cylindrical body 11. An outer peripheral surface of the first wick structure 47 is disposed in contact with an inner surface of the cylindrical body 11. Additionally, an inner tube 49 that is a tubular material having both open end portions is inserted through an inner peripheral surface of the adsorbent 42 having a cylindrical longitudinal shape and a circular radial cross-section. Accordingly, in the heat storage container 4 according to the fourth embodiment, an inner surface of the inner tube 49 becomes a wall surface of a flow channel 48. Additionally, the inner peripheral surface of the adsorbent 42 and an outer surface of the inner tube 49 are in contact with each other, so that the adsorbent 42 and the inner tube 49 are thermally connected to each other.

Even in arrangement of the first wick structure 47 of the heat storage container 4 according to the fourth embodiment, liquid-phase heat transport fluid L can be supplied to the adsorbent 42, similarly to arrangement of the first wick structure 17 of the heat storage container 1 according to the first embodiment.

Figure 5:
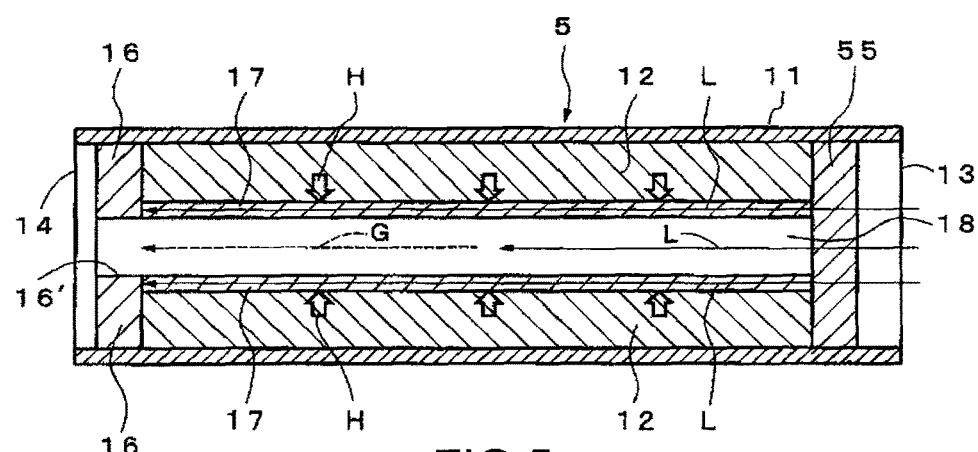
FIG. 5 is a sectional view of a side surface of a heat storage container according to a fifth embodiment of the present disclosure.

Now, a heat storage container according to a fifth embodiment of the present disclosure will be described with reference to the drawings. Description will be made while components identical with the component of the heat storage containers 1, 2, 3, 4 are denoted by the same reference numerals. As illustrated in FIG. 5, in a heat storage container 5 according to the fifth embodiment, a first lid body 55 having no hole portion 15' is used in place of the first lid body 15 having the hole portion 15' that is a part of the wall surface of the flow channel 18, and forms the end portions of the flow channel 18, of the heat storage container 1 according to the first embodiment.

Accordingly, in the heat storage container 5, one end portion of a flow channel 18 does not have an open form, and is covered with a first lid body 55. That is, the one end portion of the flow channel 18 is blocked by a surface portion of the first lid body 55 that is a porous body. Even in the above form, liquid-phase heat transport fluid L can pass through the first lid body 55 that is the porous body, and therefore the liquid-phase heat transport fluid L can be supplied to the flow channel 18. Additionally, when the liquid-phase heat transport fluid L is supplied to the heat storage container 5 from a side of one end portion 13 of a cylindrical body 11, while the porous body forming the first lid body 55 is impregnated in the liquid-phase heat transport fluid L, the liquid-phase heat transport fluid L passes through the first lid body 55 to be supplied to the flow channel 18 of the heat storage container 5. As a result, the first lid body 55 that is the porous body can also function as a member for preventing backflow of gas-phase heat transport fluid G inside the flow channel 18.

Next, a usage example of the heat storage container according to each of the above embodiments of the present disclosure will be described. Herein, description will be made while the heat storage container 1 according to the first embodiment is taken as an example. When the heat storage container 1 is installed, for example, in fluid which is a heat recovery target, an outer surface of the cylindrical body 11 receives heat from the fluid to recover the received heat into the heat storage container 1. The heat recovered from the fluid through the outer surface of the cylindrical body 11 comes into contact with the inner surface of the cylindrical body 11 and is transferred to the thermally connected adsorbent 12, and the adsorbent 12 stores the transferred heat. When the adsorbent 12 stores the heat, the heat transport fluid functioning as an adsorbate is desorbed from the adsorbent 12 and released as gas from the adsorbent 12.

On the other hand, liquid-phase heat transport fluid L functioning as an adsorbate is supplied to the heat storage container 1, and a part of the liquid-phase heat transport fluid L which has passed through the first lid body 1 and the liquid-phase heat transport fluid L supplied to the first wick structure 17 are adsorbed as an adsorbate on the adsorbent 12 storing heat, so that the heat stored in the adsorbent 12 is released from the adsorbent 12.

The Heat H released from the adsorbent 12 is transferred through the first wick structure 17 to a part of the liquid-phase heat transport fluid L functioning as an adsorbate supplied to the heat storage container 1, which is supplied from the one end portion of the flow channel 18 and is in the flow channel 18, and the liquid-phase heat transport fluid L receives the heat H and undergoes a phase change from liquid to gas in the flow channel 18. The gas-phase heat transport fluid G vaporized in the flow channel 18 is transported as a heat medium for transporting the heat H, namely the heat transport fluid, from the heat storage container 1 toward the heat use destination.

In order to improve heat recovery efficiency from the fluid as the heat recovery target of the heat storage container 1, heat exchange means, for example, fins may be mounted on the outer surface of the cylindrical body 11.

Next, an example of manufacturing method of the heat storage container of the present disclosure will be described. Herein, description will be made while a heat storage container 2 according to the second embodiment is taken as an example. The manufacturing method of the heat storage container 2 is not particularly limited. However, for example, the adsorbent 12 in a cylindrical form is first inserted along the inner surface of the cylindrical body 11 in the longitudinal direction of the cylindrical body 11. At this time, the adsorbent 12 may be a single substance, or a combination of two or more kinds of adsorbents 12 exhibiting different functions. As a slurry containing the adsorbent 12, a slurry containing a binder, an additive, etc. in addition to particles of the adsorbent 12 may be used. As the binder, for example, clay-based minerals (such as sepiolite and talc), vinyl alcohol-based or (meth)acrylic-based organic binders or inorganic binders such as alumina sol can be used. When a binder is used, it can remain and coagulate with the particles of the adsorbent 12, mutually connect these particles and closely adhere to the cylindrical body 11 of the heat storage container 2, and thus it is possible to obtain higher heat transferability between the adsorbent 12 and the cylindrical body 11. Examples of the additive include dispersants and viscosity modifiers, and it is possible to use a known additive. Next, the inner tube 19 is inserted along the longitudinal direction of the cylindrical body 11, and a material that becomes the first wick structure 17 (for example, a powdery metal material) is filled in a gap portion formed between the outer surface of the inner tube 19 and the inner peripheral surface of the adsorbent 12. Then, a material that becomes the first lid body 15 (for example, a powdery metal material), and a material that becomes the second lid body 16 (for example, a powdery metal material) are filled in the one end portion of the adsorbent 12, and another end portion of the adsorbent 12, respectively. The above materials are filled, and thereafter a heating process is performed, so that it is possible to manufacture the heat storage container 2 having the adsorbent 12, the inner side surface, the end portion, and the other end portion of which are covered with the first wick structure 17, the first lid body, and the second lid body, respectively.

The heat storage container 2 manufactured as described above may be further flattened to become a flat heat storage container as needed.

In the case where the first wick structure 17 is formed of a metal mesh or the like, for example, the wick structure 17 is formed by inserting a core rod into the cylindrical body 11 and arranging and fixing a metal mesh or the like on the outer circumferential surface of the core rod. Thereafter, the heat storage container 2 may be manufactured by filling and arranging the adsorbent 12 in a gap formed between the inner surface of the cylindrical body 11 and the outer surface of the first wick structure 17.

In a case where the heat storage container 3 according to the third embodiment, which has the second wick structure 20 on the inner surface of the inner tube 19, is manufactured, a core rod is further inserted into the inner tube 19 along a longitudinal direction of the inner tube 19, and a material that becomes the second wick structure 20 (for example, a powdery metal material) is filled in a gap portion formed between an outer peripheral surface of the core rod and the inner surface of the inner tube 19, and thereafter the above heating process is performed. After the heating process, the core rod is pulled out of the inner tube 19, so that the second wick structure 20 can be formed on the inner surface of the inner tube 19.

As a method for providing a diffusion layer (first wick structure 17) in the adsorbent 12, for example, a method described below can be employed. First, the adsorbent 12 is molded into a shape in which a hole portion having a plurality of openings mutually inserted are provided, and a core rod having a shape corresponding to a route of the hole portion is inserted from the opening to the molded adsorbent 12. Then, a material that becomes the diffusion layer (first wick structure 17) (for example, a powdery metal material) is inserted between an outer surface of the above core rod and an inner surface of the above hole portion, and the above material is heated or sintered. Thereafter, the above core rod is pulled out, so that the diffusion layer can be provided on a surface of the adsorbent 12.

Now, a heat storage device using the heat storage container of the present disclosure will be described with reference to the drawings. Herein, description will be made while a heat storage device using the heat storage container 2 according to the second embodiment is taken as an example.

Figure 6:
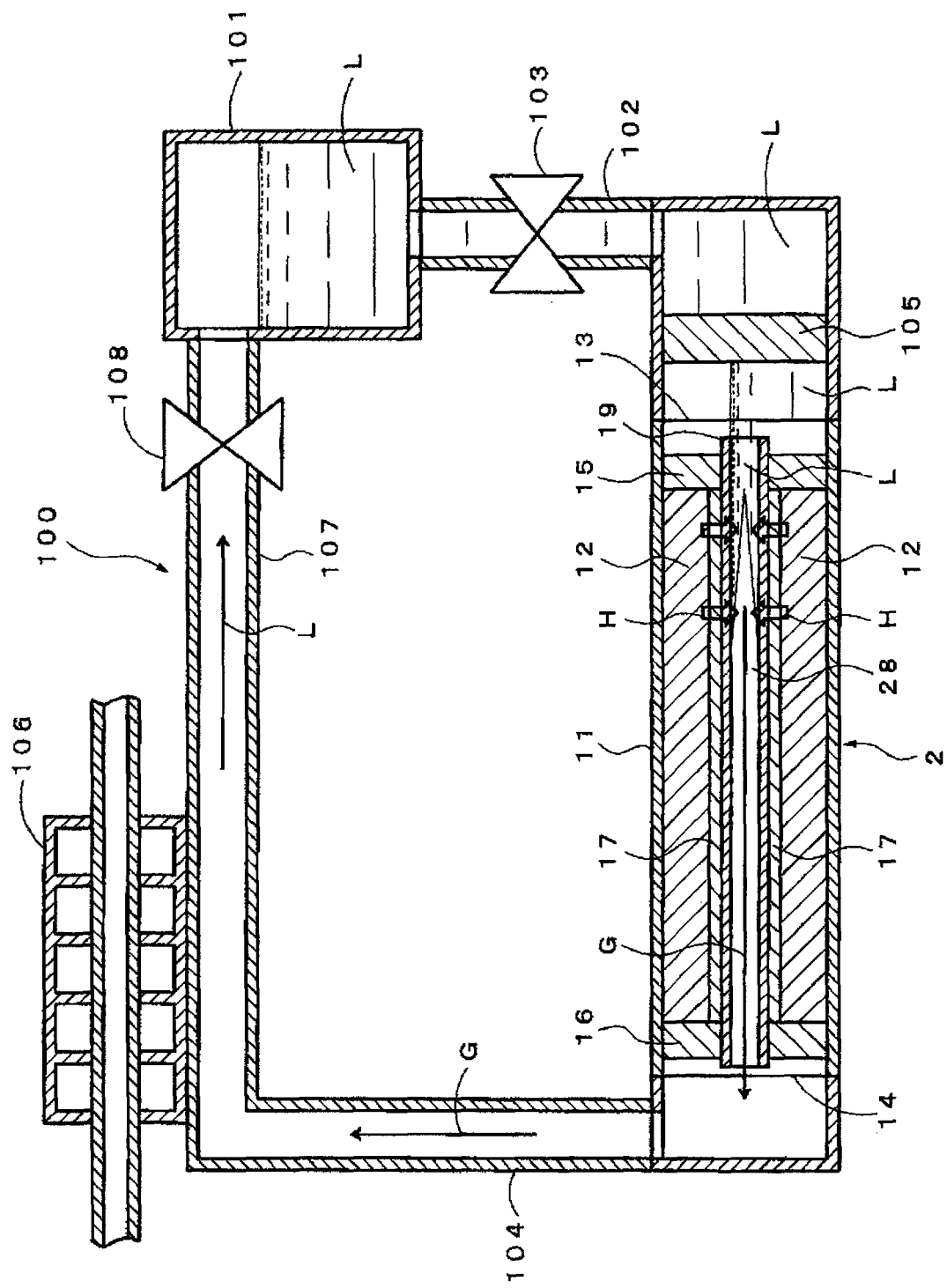
FIG. 6 is an explanatory view of a heat storage device according to a first embodiment of the present disclosure.

As illustrated in FIG. 6, in a heat storage device 100 according to the first embodiment of the present disclosure, an one open end portion 13 of a cylindrical body 11 of a heat storage container 2 is connected to a heat transport fluid container 101 that accommodates liquid-phase heat transport fluid L through a first piping system 102 provided with a first valve 103 that is heat transport fluid supplying means. As described above, the liquid-phase heat transport fluid L functions as a medium contributing to heat absorption and heat generation of the adsorbent 12, and also functions as a heat transport medium by undergoing a phase change from liquid to gas. The heat transport fluid container 101 is installed at a higher position than the heat storage container 2, and therefore the first valve 103 is opened, so that the liquid-phase heat transport fluid L flows from the heat transport fluid container 101 into the heat storage container 2, namely, a first wick structure 17 and inside of an inner tube 19 (i.e., flow channel 28) through the one open end portion 13 of the cylindrical body 11. The number of the heat storage containers 2 installed in the heat storage device 100 is not limited to one. The heat storage device 100 may be configured such that a plurality of the heat storage containers 2 are incorporated in a header portion (not illustrated) and connected in parallel.

The liquid-phase heat transport fluid L that flows into the first wick structure 17 adsorbs the adsorbent 12, so that heat H is released from the adsorbent 12. On the other hand, the liquid-phase heat transport fluid L, which flows into the flow channel 28 of the heat storage container 2, receives the heat H released from the adsorbent 12 to vaporize while moving from one end portion to another end portion of the flow channel 28, and becomes gas-phase heat transport fluid G. The gas-phase heat transport fluid G, which vaporizes inside the flow channel 28, is released as the heat transport fluid from another open end portion 14 of the cylindrical body 11, namely, from the heat storage container 2 to a second piping system 104 through the other end portion of the flow channel 28.

As illustrated in FIG. 6, in the first piping system 102, a partition wall 105 that is a porous body is disposed as a backflow suppression member between the first valve 103 and the heat storage container 2. By the partition wall 105, the first piping system 102 is separated into a side close to the heat storage container 2 and a side close to the heat transport fluid container 101. The porous body which is a material of the partition wall 105 has a through hole having such a size as to enable passing of the liquid-phase heat transport fluid L. Accordingly, when the first valve 103 is opened, while the porous body forming the partition wall 105 is being impregnated in the liquid-phase heat transport fluid L, the liquid-phase heat transport fluid L passes through the partition wall 105 from the heat transport fluid container 101 to be supplied to the heat storage container 2. As a result, the partition wall 105 of the porous body functions as a member for preventing backflow of the gas-phase heat transport fluid G inside the flow channel 28. Additionally, the backflow suppression member is provided between the first valve 103 and the heat storage container 2, so that it is possible to prevent freezing of the first valve 103.

As long as the size (mean opening diameter) of the through holes of the porous body forming partition wall 105 is a size having the above function, the size is not particularly limited, and is, for example, 50 micrometers or less. Additionally, a material of the porous body is not particularly limited, and the same materials as the first lid body 15 and the second lid body 16 can be used as the material of the porous body. More specifically, examples of the material can include a sintered compact of metal powder such as copper powder, metal mesh, foam metal, metallic foil provided with a through hole, a metal plate provided with a through hole, and the like.

As long as the above backflow suppression member is a member capable of preventing the backflow of the gas-phase heat transport fluid G in the flow channel 28, the backflow suppression member is not limited to the partition wall 105 which is the porous body. For example, a member having a single hole portion, a straightening vane, or a valve may be used.

As illustrated in FIG. 6, the other open end portion 14 of the cylindrical body 11 of the heat storage container 2 is connected to a condenser 106, which is a heat exchanger, through the second piping system 104. The gas-phase heat transport fluid G which is released from the other end portion 14 of the cylindrical body 11 to the second piping system 104 moves toward the condenser 106 inside the second piping system 104, and is introduced into the condenser 106. The condenser 106 cools and liquefies the gas-phase heat transport fluid G introduced from the second piping system 104.

The gas-phase heat transport fluid G introduced into the condenser 106 is condensed by the condenser 106, and undergoes a phase change to the liquid-phase heat transport fluid L and releases latent heat. The latent heat released by the condenser 106 is transported to the heat use destination (not illustrated) thermally connected to the condenser 106. Thus, in the heat storage device 100, the medium (i.e., the adsorbate) adsorbed on the adsorbent 12 is also used as heat transport fluid that transports the heat released from the adsorbent 12 to the heat use destination.

Furthermore, the heat storage device 100 includes a third piping system 107 that connects the condenser 106 and the heat transport fluid container 101. The liquid-phase heat transport fluid L which is generated by a phase change in the condenser 106 is returned from the condenser 106 to the heat transport fluid container 101 through the third piping system 107. Additionally, the third piping system 107 is provided with a second valve 108 that is heat transport fluid supplying means.

In the heat storage device 100, a circulation system, in which the heat transport fluid functioning as the adsorbate circulates from the heat transport fluid container 101 to the heat storage container 2, from the heat storage container 2 to the condenser 106, and from the condenser 106 to the heat transport fluid container 101 by the first piping system 102, the second piping system 104, and the third piping system 107, respectively, is formed. The circulation system is in an airtight state, and is deaerated. That is, the circulation system has a loop-shaped heat pipe structure. Additionally, the heat transport fluid container 101 is installed at a higher position than the heat storage container 2. Furthermore, the partition wall 105 that prevents the backflow of the gas-phase heat transport fluid G is disposed in the first piping system 102 disposed between the first valve 103 and the heat storage container 2.

Accordingly, even when a device (for example, a pump) for circulating the heat transport fluid functioning as the adsorbate, which is accommodated in the circulation system, is not used, the heat transport fluid functioning as the adsorbate can be smoothly circulated in the circulation system of the heat storage device 100 by capillary force of the first wick structure 17, a temperature difference between inside of the heat storage container 2 with a relatively high temperature, and inside of the condenser 106 with a relatively low temperature, and vapor pressure difference between the heat transport fluid functioning as the adsorbate inside the heat storage container 2 and the heat transport fluid functioning as the reaction medium inside the condenser 106.

Next, an operation example in which heat is stored in the heat storage container 2 by using the components of the heat storage device 100 of FIG. 6 will be described. When storing heat in the heat storage container 2, the first valve 103 of the heat storage device 100 is closed and the second valve 108 is opened so that the heat storage container 2 receives heat from external environment of the heat storage container 2. When the heat storage container 2 receives the heat from the external environment, the adsorbent 12 releases the gas of heat transport fluid functioning as an adsorbate. The adsorbate in gas phase released from the adsorbent 12 passes through the first wick structure 17 or the second lid body 16 which is the porous body, and is released to the internal space of the heat storage container 2. The adsorbate in gas phase released to the internal space of the heat storage container 2 is transported to the second piping system 104, the condenser 106 (the adsorbate undergoes a phase change from gas to liquid in the condenser 106), and is transported as the adsorbate in liquid phase (i.e., the liquid-phase heat transport fluid L) to the heat transport fluid container 101 through the third piping system 107.

The first valve 103 may be closed at a time point when a temperature of the heat storage container 2 reaches a predetermined heat release temperature, and the heat release temperature may be measured by a thermometer, or, may be determined, for example, from a time when the adsorbent 12 releases heat, a time when a predetermined time elapses from start of heat release of the adsorbent 12, a time when a predetermined amount of the liquid-phase heat transport fluid L is returned to the heat transport fluid container 101, or a time when a heat release amount of the heat exchanger reaches a predetermined value.

In a case where heat storage of the heat storage container 2 is completed, not only the first valve 103 but also the second valve 108 is closed, and the liquid-phase heat transport fluid L is confined inside the heat transport fluid container 101.

The second valve 108 may be closed in accordance with an accommodation amount of the liquid-phase heat transport fluid L in the heat transport fluid container 101. As the accommodation amount of the liquid-phase heat transport fluid L, the accommodation amount of the liquid-phase heat transport fluid L in the heat transport fluid container 101 may be measured. Additionally, the accommodation amount of the liquid-phase heat transport fluid L may be determined from a heat release time or a heat release amount of the adsorbent 12, weight of the heat transport fluid container 101, a heat release amount of the condenser 106, an emission amount of the liquid-phase heat transport fluid L from the condenser 106, or the like.

On the other hand, in a case where heat stored in the heat storage container 2 is transported from the heat storage container 2 toward the heat use destination, while the first valve 103 of the heat storage device 100 is opened and the liquid-phase heat transport fluid L is supplied to the heat storage container 2, the second valve 108 is opened and the circulation system of the heat storage device 100 is opened, so that the heat storage device 100 is operated.

Now, a heat storage device according to a second embodiment of the present disclosure will be described with reference to the drawings. Description will be made while components identical with the component of the heat storage device 100 according to the first embodiment are denoted by the same reference numerals.

Figure 7:
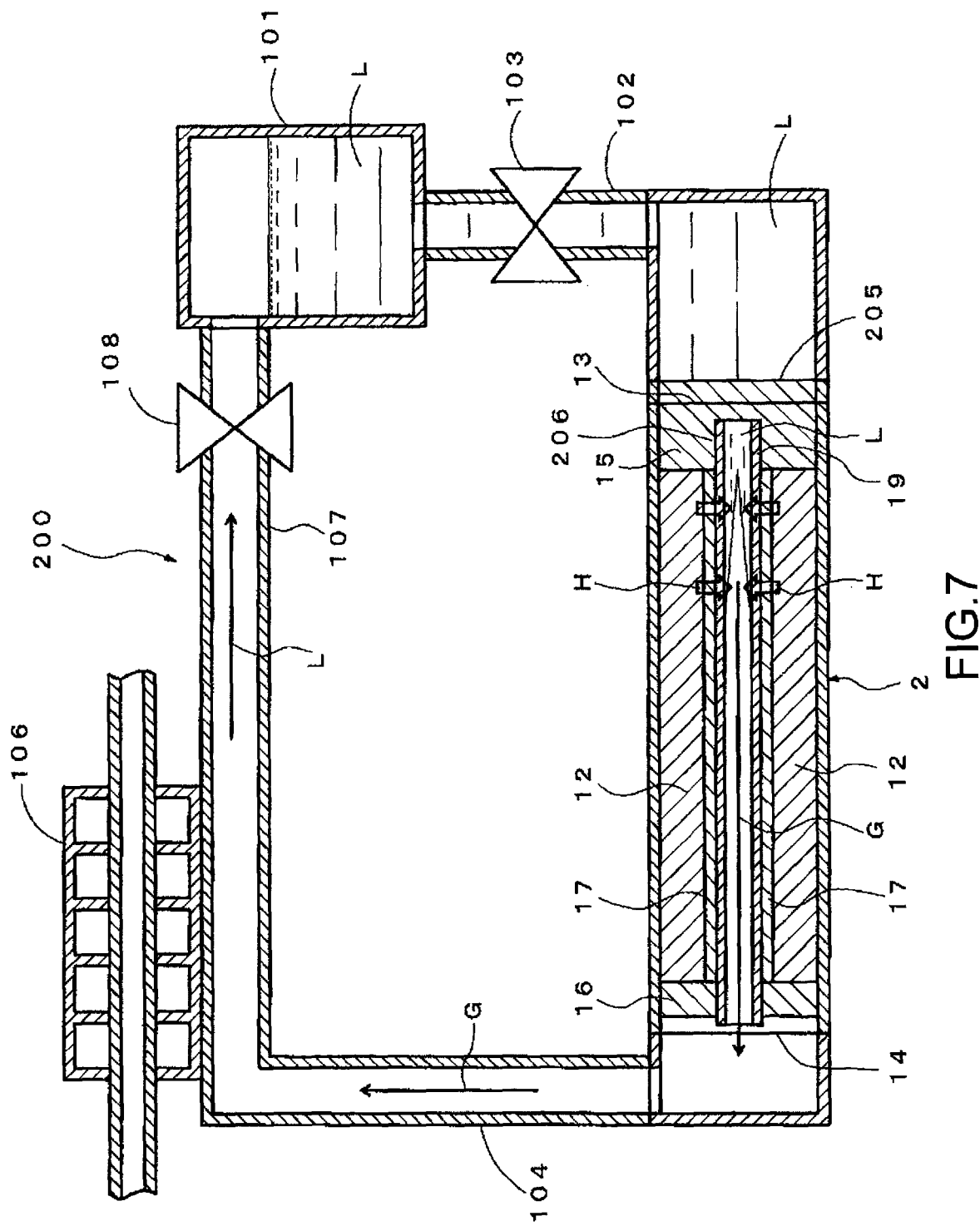
FIG. 7 is an explanatory view of a heat storage device according to a second embodiment of the present disclosure.
Figure 8:
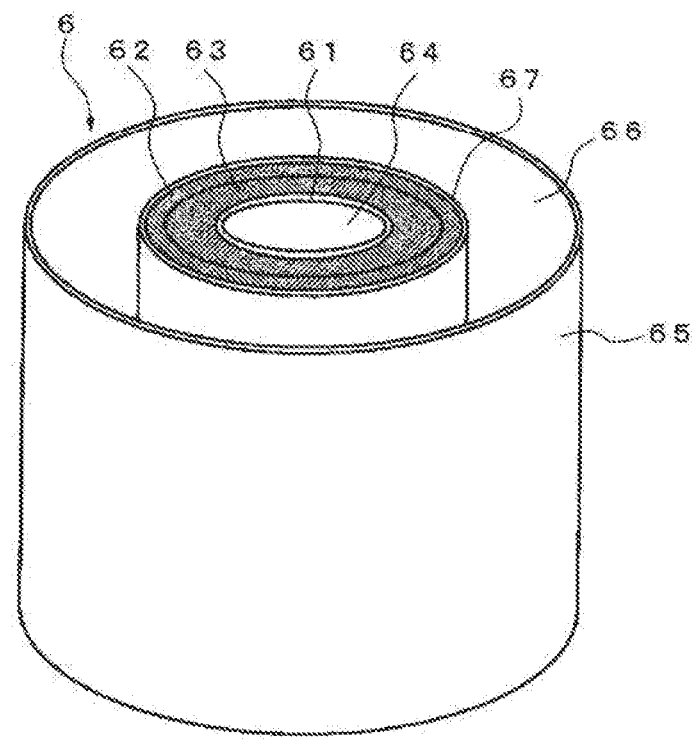
FIG. 8 is an explanatory view of a related heat storage device.

As illustrated in FIG. 7, in a heat storage device 200 according to a second embodiment, a partition wall 205 formed of a porous body, which is a backflow suppression member, is integrated with a first lid body 15 formed of a porous body of a heat storage container 2. That is, a hole portion 206 corresponding to a diameter of a shape of an inner tube 19 is formed in a radially central portion of the partition wall 205, and an end portion of the inner tube 19, and a vicinity of the end portion are inserted through the hole portion 206. Accordingly, the one open end portion of the inner tube 19 is blocked by the partition wall 205. Additionally, an external form of the partition wall 205 corresponds to a shape and an inner diameter of a first piping system 102, and the partition wall 205 is fitted in the first piping system 102, so that an inner surface of the first piping system 102 and an outer peripheral surface of the partition wall 205 are in contact with each other. Accordingly, while a side close to the heat storage container 2 of the partition wall 205 functions as the first lid body 15, a side close to a heat transport fluid container 101 of the partition wall 205 separates an internal space of the heat storage container 2 and the first piping system 102.

In the heat storage device 200 according to the second embodiment, the partition wall 205 is located at a boundary portion between the heat storage container 2 and the first piping system 102. When a first valve 103 provided in the first piping system 102 is opened, even the partition wall 205 integrated with the first lid body 15 is impregnated in liquid-phase heat transport fluid L, and therefore functions as a member for preventing backflow of gas-phase heat transport fluid G.

Now, an example of a warm-up device using the heat storage device of the present disclosure will be described. The heat storage container of the heat storage device is mounted on, for example, an exhaust pipe connected to an internal combustion engine (such as an engine) mounted on a vehicle, so that heat in exhaust gas that flows in the exhaust pipe can be stored in the heat storage container. The heat storage container is disposed such that an outer surface of the cylindrical body of the heat storage container is in direct contact with the exhaust gas that flows in the exhaust pipe, so that the heat storage container can be thermally connected to a heat source.

The heat derived from the exhaust gas, which is stored in the heat storage container, is transported from the heat storage container to the heat exchanger (for example, the condenser) in the circulation system of the heat storage device, and is further transported from the heat exchanger to the warm-up device of the internal combustion engine which is a heat use destination.

Now, another embodiment of the present disclosure will be described. In the heat storage container 2 according to the second embodiment, the first wick structure 17 is a member such as a metal sintered compact formed by sintering a powdery metal material, and metal mesh. However, in place of this, a groove that is formed in the outer surface of the inner tube 19, and has capillary force may be employed. Additionally, in the heat storage container 3 according to the third embodiment, the second wick structure 20 is a member such as a metal sintered compact formed by sintering a powdery metal material, and metal mesh. However, in place of this, a groove that is formed in the inner surface of the inner tube 19 and has capillary force may be employed.

In the heat storage container 4 according to the fourth embodiment, the first wick structure 47 is a member such as a metal sintered compact formed by sintering a powdery metal material, and metal mesh. However, in place of this, a groove that is formed in the inner surface of the cylindrical body 11 and has capillary force may be employed. Additionally, in the heat storage container 4 according to the fourth embodiment, a second wick structure having a capillary structure may be further provided on the inner surface of the inner tube.

In each of the above embodiments, the radial cross-section of the cylindrical body 11 has a circular shape. However, the shape of the cross-section is not particularly limited, and may be, for example, an elliptic shape, a polygonal shape such as a triangular shape and a square shape, an oval shape, and a rectangular shape with round corners, or the like, in addition to a flat shape described above. Furthermore, in each of the above embodiments, the first lid body 15 and the second lid body 16 each are a porous body. However, in place of this, the first lid body 15 and the second lid body 16 each are a wick structure having a capillary structure.

In each of the heat storage containers 2, 3, 4 according to the second, third, and fourth embodiments, the first lid body 15 having the hole portion 15' is used. However, in place of this, similarly to the heat storage container 5 according to the fifth embodiment, a first lid body which does not have any hole portion may be used. In this case, a length of the inner tube is made to be suitably shorter than a length of each of the inner tubes 19, 49 of the heat storage container 2, 3, 4, so that the first lid body which does not have any hole portion can be disposed adjacent to the adsorbent on the one end portion side of the cylindrical body.

The heat storage container 5 according to the fifth embodiment has a structure in which the first lid body 55 does not have any hole portion. However, in place of this, the heat storage container 5 may have a structure in which not only the first lid body 55 but also the second lid body does not have any hole portion.

In the heat storage container of each of the above embodiments, one first wick structure is provided. However, the number of first wick structures is not particularly limited, and a plurality of first wick structures may be provided in accordance with a usage situation. Additionally, in the heat storage container of each of the above embodiments, one flow channel is provided inside the first wick structure. However, the number of flow channels is not particularly limited, and a plurality of flow channels may be provided in accordance with a usage situation. Furthermore, in the heat storage container of each of the above embodiments, the wick structure is used as the diffusion layer. However, the pore structure of the adsorbent may be used instead of the wick structure.

In addition to a warm-up device for an internal combustion engine mounted on a vehicle, a usage method of the heat storage device of the present disclosure is not particularly limited. The heat storage device may be used for, for example, a heating device in a vehicle. Additionally, the heat storage device of the present disclosure may be used to recover, store, and utilize waste heat from an industrial plant. Furthermore, examples of another heat use destination of the heat storage device of the present disclosure can include an indoor heating device, a water heater, a dryer, and the like.

In each of the embodiments of the heat storage device, the heat storage container 2 according to the second embodiment is used. However, in place of this, the heat storage container according to the other embodiment may be used. In a case where the heat storage container 5 according to the fifth embodiment is used for the heat storage device, any partition wall for preventing backflow of gas-phase heat transport fluid may not be provided.

It is possible to obtain a heat storage container capable of improving a heat generation amount and a heat transport amount with a simple configuration and capable of preventing shape collapse of an adsorbent even when liquid such as water is used as an adsorbate, and obtain a heat storage device which, even when provided with a heat storage container using liquid such as water as an adsorbate, is capable of preventing a backflow of heat transport fluid which is vaporized inside the heat storage container and functions as an adsorbate. Therefore, the heat storage container and the heat storage device have a high utility value in the fields of recovery, storage, and utilization of waste heat from an engine, an industrial plant, etc., for example, in the field of recovering, storing, and utilizing waste heat by being mounted on a vehicle.

What is claimed is:
1. A heat storage container comprising:
a tubular body;
an adsorbent that is accommodated in the tubular body, generates heat by adsorption of an adsorbate and absorbs heat by desorption of the adsorbate;
a first lid body that is a porous body, and is provided adjacent to the adsorbent on a side of one end portion of the tubular body;
a second lid body that s a porous body, and is provided adjacent to the adsorbent on a side of another end portion of the tubular body;
a first ick structure that is provided adjacent to inside of the adsorbent between the first lid body and the second lid body, and has a capillary structure; and
a flow channel that is provided inside the first wick structure, and penetrates the tubular body to a longitudinal direction,
wherein:
the first lid body and the second lid body each have through-holes, each through-hole having a size which allows passing of a liquid-phase heat transport fluid but does not allow passing of a powder from the adsorbent, the liquid-phase heat transport fluid is supplied to one end portion of the adsorbent through the first lid body, the liquid-phase heat transport fluid flows from one end portion of the adsorbent to another end portion of the adsorbent along a longitudinal direction of the tubular body by a capillary force of the first wick structure, one end portion of the first wick structure is in contact with the first lid body, and another end portion of the first wick structure is in contact with the second lid body, and the liquid-phase heat transport fluid is supplied from the first lid body to the second lid body through the first wick structure.

2. The heat storage container according to claim 1, wherein
an inner tube forming the flow channel is accommodated in the tubular body.

3. The heat storage contain according to claim 1, wherein the first wick structure is metal mesh, or a metal sintered compact formed by sintering a powdery metal material.

4. The heat storage container according to claim 2, wherein
the first wick structure is a groove that is formed in an outer surface of the inner tube and has capillary force.

5. A heat storage container comprising:
a tubular body;
an adsorbent that is accommodated in the tubular body, generates heat by adsorption of an adsorbate and absorbs heat by desorption of the adsorbate;
a first lid body that is a porous body, and is provided adjacent to the adsorbent on a side of one end portion of the tubular body;
a second lid body that is a porous body, and is provided adjacent to the adsorbent on a side of another end portion of the tubular body;
a first wick structure that is provided adjacent to inside of the adsorbent between the first lid body and the second lid body, and has a capillary structure; and
a flow channel that is provided inside the first wick structure, and is formed in longitudinal direction of the tubular body,
wherein:
the flow channel is blocked by the first lid body,
the first lid body and the second lid body each have through-holes, each through-hole having a size which allows passing of a liquid-phase heat transport fluid but does not allow passing of a powder from the adsorbent,
the liquid-phase heat transport fluid is supplied to one end portion the adsorbent through the first lid body,
the liquid-phase heat transport fluid flows from one end portion of the adsorbent to another end portion of the adsorbent along a longitudinal direction of the tubular body by a capillary force of the first wick structure,
one end portion of the first wick structure is in contact with the first lid body, and another end portion of the first wick structure is in contact with the second lid body, and
the liquid-phase heat transport fluid is supplied from the first lid body to the second lid body through the first wick structure.

6. A heat storage device comprising a circulation system including:
a heat storage container having a tubular body, an adsorbent that is accommodated in the tubular body, generates heat by adsorption of an adsorbate and absorbs heat by desorption of the adsorbate, a first lid body that is a porous body, and is provided adjacent to the adsorbent on a side of one end portion of the tubular body, a second lid body that is a porous body, and is provided adjacent to the adsorbent on a side of another end portion of the tubular body, a first wick structure that is provided adjacent to inside of the adsorbent between the first lid body and the second lid body, and has a capillary structure, and a flow channel that is provided inside the first wick structure, and is formed in a longitudinal direction of the tubular body, the flow channel being blocked by the first lid body;
a heat transport fluid container that is connected to the one end portion of the tubular body, and accommodates the adsorbate in liquid phase;
a condenser that is connected to the other end portion of the tubular body, and liquefies the vaporized adsorbate; and
a piping system that connects the heat transport fluid container and the condenser, and supplies, to the heat transport fluid container, the adsorbate its liquid phase obtained by the condenser,
the circulation system being in an airtight state, and being deaerated,
wherein:
a backflow suppression member is disposed between the heat storage container and the heat transport fluid container,
the first lid body and the second lid body each have through-holes, each through-hole having a size which allows passing of a liquid-phase heat transport fluid but does not allow passing of a powder from the adsorbent,
the liquid-phase heat transport fluid is supplied to one end portion of the adsorbent through the first lid body,
the liquid-phase heat transport fluid flows from one end portion of the adsorbent to another end portion of the adsorbent along a longitudinal direction of the tubular body by a capillary force of the first wick structure,
one end portion of the first wick structure is in contact with the first lid body, and another end portion of the first wick structure is in contact with the second lid body, and
the liquid-phase heat transport fluid is supplied from the first lid body to the second lid body through the first wick structure.

7. The heat storage device according to claim 6, wherein the backflow suppression member is integrated with the first lid body.

8. A warm-up device using the heat storage device according is claim 6.

* * * * *